(12) United States Patent
Li et al.

(10) Patent No.: US 10,520,798 B2
(45) Date of Patent: Dec. 31, 2019

(54) HOUSING AND PROJECTION DEVICE

(71) Applicant: APPOTRONICS CORPORATION LIMITED, Shenzhen, Guangdong (CN)

(72) Inventors: Dongsheng Li, Shenzhen (CN); Yi Li, Shenzhen (CN)

(73) Assignee: APPOTRONICS CORPORATION LIMITED, Shenzhen, Guangdong (CN)

( * ) Notice: Subject to any disclaimer, the term of this patent is extended or adjusted under 35 U.S.C. 154(b) by 0 days.

(21) Appl. No.: 16/319,262

(22) PCT Filed: May 18, 2017

(86) PCT No.: PCT/CN2017/084821
§ 371 (c)(1),
(2) Date: Jan. 18, 2019

(87) PCT Pub. No.: WO2018/014643
PCT Pub. Date: Jan. 25, 2018

(65) Prior Publication Data
US 2019/0243223 A1    Aug. 8, 2019

(30) Foreign Application Priority Data

Jul. 20, 2016  (CN) .......................... 2016 1 0574091

(51) Int. Cl.
*G03B 21/14*    (2006.01)
(52) U.S. Cl.
CPC ........... *G03B 21/145* (2013.01); *G03B 21/14* (2013.01); *G03B 21/142* (2013.01)
(58) Field of Classification Search
CPC ..... G03B 21/14; G03B 21/145; G03B 21/142
(Continued)

(56) References Cited

U.S. PATENT DOCUMENTS

| 2004/0080719 | A1 | 4/2004 | Morinaga | |
| 2006/0164609 | A1* | 7/2006 | Liu | G03B 9/02 |
| | | | | 353/97 |
| 2010/0020294 | A1* | 1/2010 | Okazaki | H04N 9/3141 |
| | | | | 353/101 |

FOREIGN PATENT DOCUMENTS

| CN | 1941795 A | 4/2001 |
| CN | 2485675 Y | 4/2002 |

(Continued)

OTHER PUBLICATIONS

International Search Report of Patent Application No. PCT/CN2017/084821—2 pages (dated Jul. 26, 2017).

*Primary Examiner* — William C. Dowling
(74) *Attorney, Agent, or Firm* — Knobbe Martens Olson & Bear, LLP

(57) ABSTRACT

Disclosed are a housing and a projection device comprising the housing. The housing comprises a case body, the case body comprising a first substrate, a second substrate and an annular connection plate, wherein the first substrate and the second substrate are arranged oppositely, the annular connection plate is disposed between the first substrate and the second substrate, the second substrate comprises a lens placement region in which a lens of the projection device is to be arranged, and a region, corresponding to the lens, of the annular connection plate is an opening region. The housing further comprises a knob lens cap arranged at the lens placement region, wherein the knob lens cap comprises a knob portion movably connected to the case body and extending out of the case body; and the knob portion drives the knob lens cap to rotate and move so as to shelter or expose the lens.

18 Claims, 4 Drawing Sheets

(58) Field of Classification Search
USPC .......................................... 353/100, 102, 97
See application file for complete search history.

(56) References Cited

FOREIGN PATENT DOCUMENTS

| | | |
|---|---|---|
| CN | 1955838 A | 5/2007 |
| CN | 205910477 U | 1/2017 |
| JP | 2005-157237 A | 6/2005 |

* cited by examiner

HOUSING AND PROJECTION DEVICE

CROSS-REFERENCE TO RELATED APPLICATIONS

The present application is a national phase application of International Application No. PCT/CN2017/084821 filed May 18, 2017, which claims priority to Chinese Patent Application No. 201610574091.9, filed on Jul. 20, 2016, the contents of which are incorporated herein by reference in their entireties.

TECHNICAL FIELD

The present disclosure relates to the field of projection technologies, and more specifically, to a housing and a projection device.

BACKGROUND

A projector is a device that modulates a light beam emitted from a light source device based on image information, and then projects the modulated light beam by a lens. At present, projectors have been widely used in various aspects of life and work such as conferences, reports, teaching, etc., and gradually become part of people's lives and work.

SUMMARY

Technical Problem to be Solved

Most projectors on the current market have their lenses exposed, such that dust particles easily attach to the lenses, resulting in poor projection images.

Solution to the Problem

In view of this, the present disclosure provides a housing and a projection device. The housing includes a knob lens cap, and the knob lens cap includes a knob portion. The knob lens cap can be rotated by rotation of the knob portion, so as to shelter or expose the lens. Under the premise of ensuring normal usage of the projection device, when usage of the projection device is stopped, the knob lens cap shelters the lens so as to protect the lens and improve the circumstance of dust attachment to the lens. Besides, the knob portion provided by the present disclosure protrudes from the case body, thereby further facilitating the user's operation.

To achieve the above purpose, the technical solutions provided by the present disclosure are as follows.

The present disclosure provides a housing applied in a projection device, including: a case body comprising a first substrate, a second substrate and an annular connection plate that enclose an internal space, wherein the first substrate is disposed oppositely to the second substrate, and the annular connection plate is disposed between the first substrate and the second substrate; the second substrate comprises a lens placement region in which a lens of the projection device is to be arranged, and an region of the annular connection plate corresponding to the lens is an opening region; and a knob lens cap disposed in the lens placement region, the knob lens cap comprising a knob portion movably connected to the case body and extending out of the case body, the knob portion being configured to be rotated to drive the knob lens cap to rotate and move so as to shelter or expose the lens.

Optionally, a central axis of rotation of the knob lens cap is perpendicular to the second substrate and the first substrate, and the knob portion extends from the second substrate to the first substrate and extends out of the first substrate;

the knob lens cap comprises a sheltering portion and an opening portion that are disposed between the first substrate and the second substrate, and the sheltering portion and the opening portion are connected to the knob portion, the knob portion being configured to be rotated to drive the sheltering portion or the opening portion to align with the lens.

Optionally, an outer surface of the knob portion is a frosted surface or provided with a plurality of stripes.

Optionally, the case body is provided with a track; the knob lens cap is provided with a rail that matches the track, and the track guides the rail to move, so that rotation of the knob portion drives the knob lens cap to rotate and move to shelter or expose the lens.

Optionally, a groove surrounding the knob portion is formed at a side of the first substrate facing away from the second substrate, and the groove is the track; and the rail is formed outside the knob portion.

Optionally, the housing further comprises a cover plate disposed on the side of the first substrate facing away from the second substrate;

wherein the cover plate is used to lock the rail in the track.

Optionally, the housing further comprises:

a dustproof cover fixed to a side of the second substrate facing the first substrate, wherein the dustproof cover is disposed in a space region enclosed by the knob lens cap, and an internal space of the dustproof cover is where the lens is to be arranged; and wherein the dustproof cover is provided with a hollow light-transmission opening, and the hollow light-transmission opening is arranged to face the lens.

Optionally, the housing further comprises a power control switch disposed in the knob lens cap, the power control switch being configured to control connection and disconnection between the projection device and a power supply; wherein under control of the knob lens cap, the power control switch is switched on when the knob lens cap exposes the lens and switched off when the knob lens cap shelters the lens.

Optionally, a focusing opening passing through the knob portion is formed in a direction along a central axis of rotation of the knob portion, and the housing further comprises a focusing knob disposed through the focusing opening, and the focusing knob is configured to focus the lens.

Correspondingly, the present disclosure also provides a projection device, and the projection device comprises the housing described above.

Beneficial Effect

Compared with the prior art, the technical solutions provided by the present disclosure have at least the following advantages.

The present disclosure provides a housing and a projection device, including a case body and a knob lens cap. The case body includes a first substrate, a second substrate, and an annular connection plate that enclose an internal space, the first substrate is disposed oppositely to the second substrate, and the annular connection plate is disposed between the first substrate and the second substrate; the second substrate includes a lens placement region in which a lens of the projection device is to be arranged, and an region, aligning with the lens, of the annular connection plate is an opening region; the knob lens cap is disposed in the lens placement region and includes a knob portion movably connected to the case body and extending out of the case body, and rotation of the knob portion drives the knob lens cap to rotate and move, so as to shelter or expose the lens.

It can be seen from the above that, in the technical solutions provided by the present disclosure, the housing includes a knob lens cap, and the knob lens cap includes a knob portion. The knob portion can be rotated to drive the knob lens cap to move so as to shelter or expose the lens. Under the premise of ensuring normal usage of the projection device, when usage of the projection device is stopped, the knob lens cap shelters the lens so as to protect the lens and improve the circumstance of dust attachment to the lens. Moreover, by operating the knob lens cap in a rotating manner, it is convenient to operate the knob lens cap. Besides, the knob portion extends out of the case body, thereby further facilitating the user's operation. In other words, the knob portion of the knob lens cap extends out of the case body, so that the user can conveniently rotate the knob portion.

BRIEF DESCRIPTION OF DRAWINGS

In order to more clearly illustrate technical solutions in embodiments of the present disclosure or in the prior art, the accompanying drawings used for describing the embodiments or the prior art are briefly introduced as follows. It should be noted that the drawings described as follows are merely part of the embodiments of the present disclosure, other drawings can also be acquired by those skilled in the art without paying creative efforts.

DESCRIPTION OF EMBODIMENTS

The technical solutions in the embodiments of the present disclosure are clearly and completely described in the following with reference to the accompanying drawings. It should be understood that the described embodiments are merely part of the embodiments of the present disclosure, but not all of the embodiments. Based on the embodiments in the present disclosure, all other embodiments obtained by those skilled in the art without creative efforts are within the protection scope of the present disclosure.

As described in the background, most projectors on the current market have their lenses exposed, such that dust particles easily attach to the lenses, resulting in poor projection images.

Based on this, embodiments of the present disclosure provide a housing and a projection device. The housing includes a knob lens cap, and the knob lens cap includes a knob portion. The knob portion can be rotated to drive the knob lens cap to move, so as to shelter or expose the lens. Under the premise of ensuring normal usage of the projection device, when usage of the projection device is stopped, the knob lens cap shelters the lens so as to protect the lens and improve the circumstance of dust attachment to the lens. Moreover, the knob portion extends out of the case body, thereby further facilitating the user's operation. In order to achieve the above purpose, the technical solutions provided by the embodiments of the present disclosure are described in details as follows with reference to FIG. 1 to FIG. 5.

Figure 1:
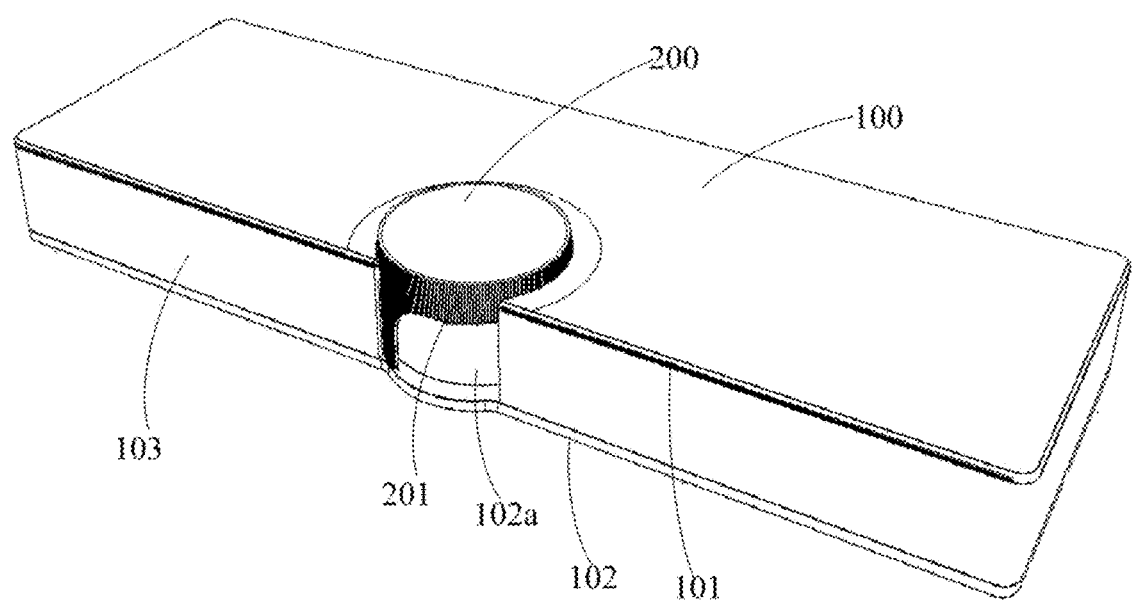
FIG. 1 is a schematic structural diagram of a housing according to an embodiment of the present disclosure.

As shown in FIG. 1, FIG. 1 is a schematic structural diagram of a housing according to an embodiment of the present disclosure, the housing provided by this embodiment of the present disclosure being applied to a projection device. The housing includes:

a case body 100, the case body 100 including a first substrate 101, a second substrate 102 and an annular connection plate 103 enclosing an internal space, the first substrate 101 being disposed oppositely to the second substrate 102, the annular connection plate 103 being disposed between the first substrate 101 and the second substrate 102; the second substrate 102 including a lens placement region 102a for arranging a lens (not shown) of the projection device, an region, corresponding to the lens, of the annular connection plate 103 being an opening region; and a knob lens cap 200 disposed in the lens placement region 102a, the knob lens cap 200 including a knob portion 201 movably connected to the case body 100 and protruding from the case body 100, the knob portion 201 being configured to be rotated to drive the knob lens cap 200 to rotate and move, so as to shelter or expose the lens.

Figure 2:
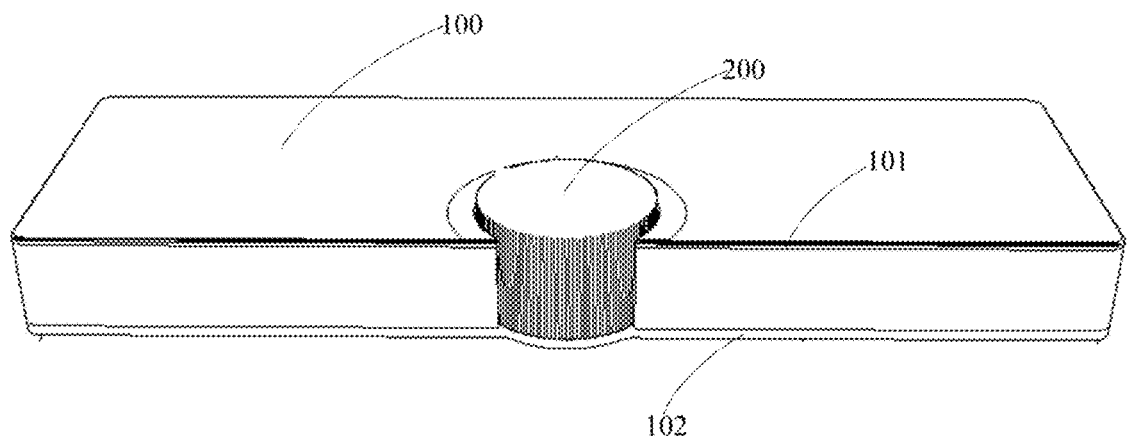
FIG. 2 is a schematic structural diagram of another housing according to an embodiment of the present disclosure.

For the housing provided by this embodiment of the present disclosure, the lens placement region 102a of the second substrate is configured to fixedly place the lens of the projection device. The exit light beam of the lens exits from the opening region of the annular connection plate 103. In order to protect the lens and improve the circumstance of dust attachment to the lens, the housing in this embodiment is provided with a knob lens cap 200. The knob lens cap 200 includes a knob portion 201. A user rotates the knob portion 201 to drive the knob lens cap 200 to move so as to achieve a purpose of sheltering or exposing the lens, that is, the knob portion 201 is rotated to drive the knob lens cap 200 to move so as to shelter or expose the opening region of the annular connection plate 103. With reference to FIG. 1, when the projection device is operated, the projection light beam generated by the lens of the projection device needs to shoot out, at this time, the user rotates the knob portion 201 to drive the knob lens cap 200 to move so as to expose the lens. FIG. 2 is a schematic structural diagram of another housing according to an embodiment of the present disclosure. With reference to FIG. 2, when usage of the projection device is stopped, the user rotates the knob portion 201 to drive the knob lens cap 200 to move so as to shelter the lens, thereby achieving a purpose of protecting the lens and improving from the circumstance of dust attachment to the lens.

The housing provided in the present disclosure is used for placing structural components such as a lens, a light source device, and the like of the projection device. In the embodiments of the present disclosure, the case body and the knob lens cap of the housing may be made of metal material or plastic material, which will not be limited herein. Moreover, as for the shape of the case body in the embodiments of the present disclosure, when both the first substrate and the second substrate are circular, the annular connection plate is shaped like a circular ring; when both the first substrate and the second substrate are elliptical, the annual connection plate is shaped like an elliptical ring; or, when both the first substrate and the second substrate are quadrate or rectangular, the annular connection plate is shaped like a quadrate ring or a rectangular ring, which is not limited herein and can be designed according to actual demands.

Figure 3:
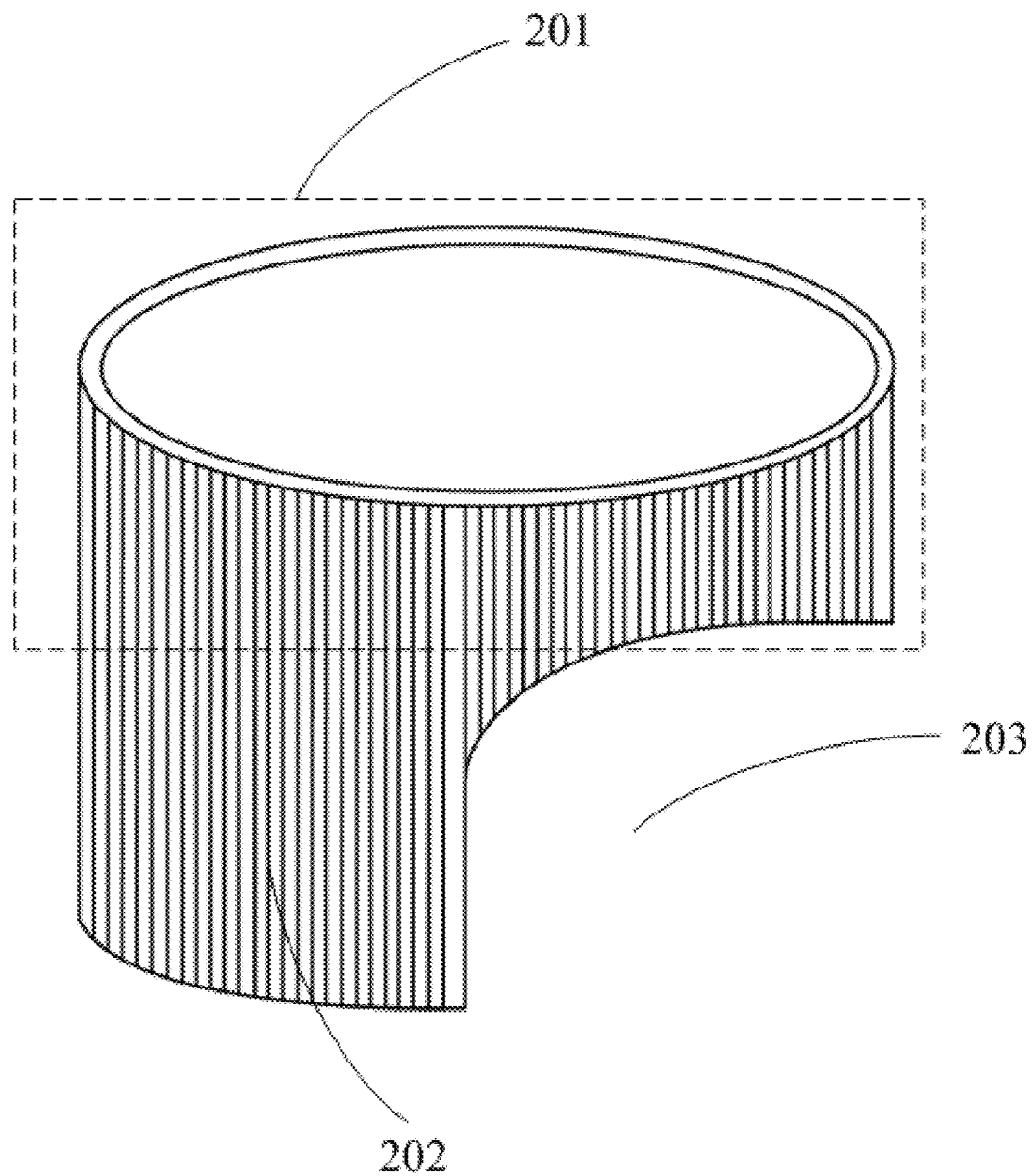
FIG. 3 is a schematic structural diagram of a knob lens cap according to an embodiment of the present disclosure.

In an embodiment of the present disclosure, the knob lens cap 200 is rotated in a direction from the first substrate 101 toward the second substrate 102, that is, a central axis of rotation of the knob lens cap 200 may be perpendicular to the first substrate 101 and the second substrate 102. Moreover, for sheltering or exposing the lens, the knob lens cap 200 may include a sheltering portion and an opening portion that are disposed between the first substrate 101 and the second substrate 102. When the knob lens cap 200 moves, the lens is sheltered by the sheltering portion and exposed by the opening portion. FIG. 3 is a schematic structural diagram of a knob lens cap according to an embodiment of the present disclosure. With reference to FIG. 1 and FIG. 3, a center axis of rotation of the knob lens cap 200 according to an embodiment of the present disclosure is perpendicular to the first substrate 101 and the second substrate 102, and the knob portion 201 extends from the second substrate 102 to the first substrate 101 and extends out of the first substrate 101.

Furthermore, the knob lens cap 200 includes a sheltering portion 202 and an opening portion 203 that are disposed between the first substrate 101 and the second substrate 102, and the sheltering portion 202 and the opening portion 203 are connected to the knob portion 201. The knob portion 201 is rotated to drive the sheltering portion 202 or the opening portion 203 to correspond to the lens.

It should be noted that in the knob lens cap 200 provided in this embodiment of the present disclosure, the knob portion 201 is preferably shaped like a circular ring. Moreover, in this embodiment of the present disclosure, the knob portion 201 and the sheltering portion 202 are preferably formed as an integral structure, or the sheltering portion 202 and the knob portion 201 are separately formed and then connected and fixed to each other, which will not be limited herein and should be designed according to actual demands. Moreover, in other embodiments of the present disclosure, the knob lens cap can also be rotated in other directions, that is, the central axis of rotation of the knob lens cap can also be at different angles with respect to the first substrate and the second substrate, or the central axis of rotation of the knob lens cap is parallel to both the first substrate and the second substrate, which is not limited herein. Moreover, respective areas occupied by the sheltering portion 202 and the opening portion 203 of the knob lens cap 200 are not limited herein by the present disclosure and should be designed according to actual demands.

Furthermore, in order to increase roughness of an outer surface of the knob portion 201 so that the knob portion 201 can be more easily rotated by the user, the outer surface of the knob portion 201 in the embodiments of the present disclosure is a frosted surface or provided with a plurality of stripes. Moreover, in the embodiments of the present disclosure, for keeping consistency of the knob lens cap 200, an outer surface of the sheltering portion 202 of the knob lens cap 200 is also a frosted surface or provided with a plurality of stripes, and the outer surface of the sheltering portion 202 is consistent with the outer surface of the knob portion 201.

Figure 4:
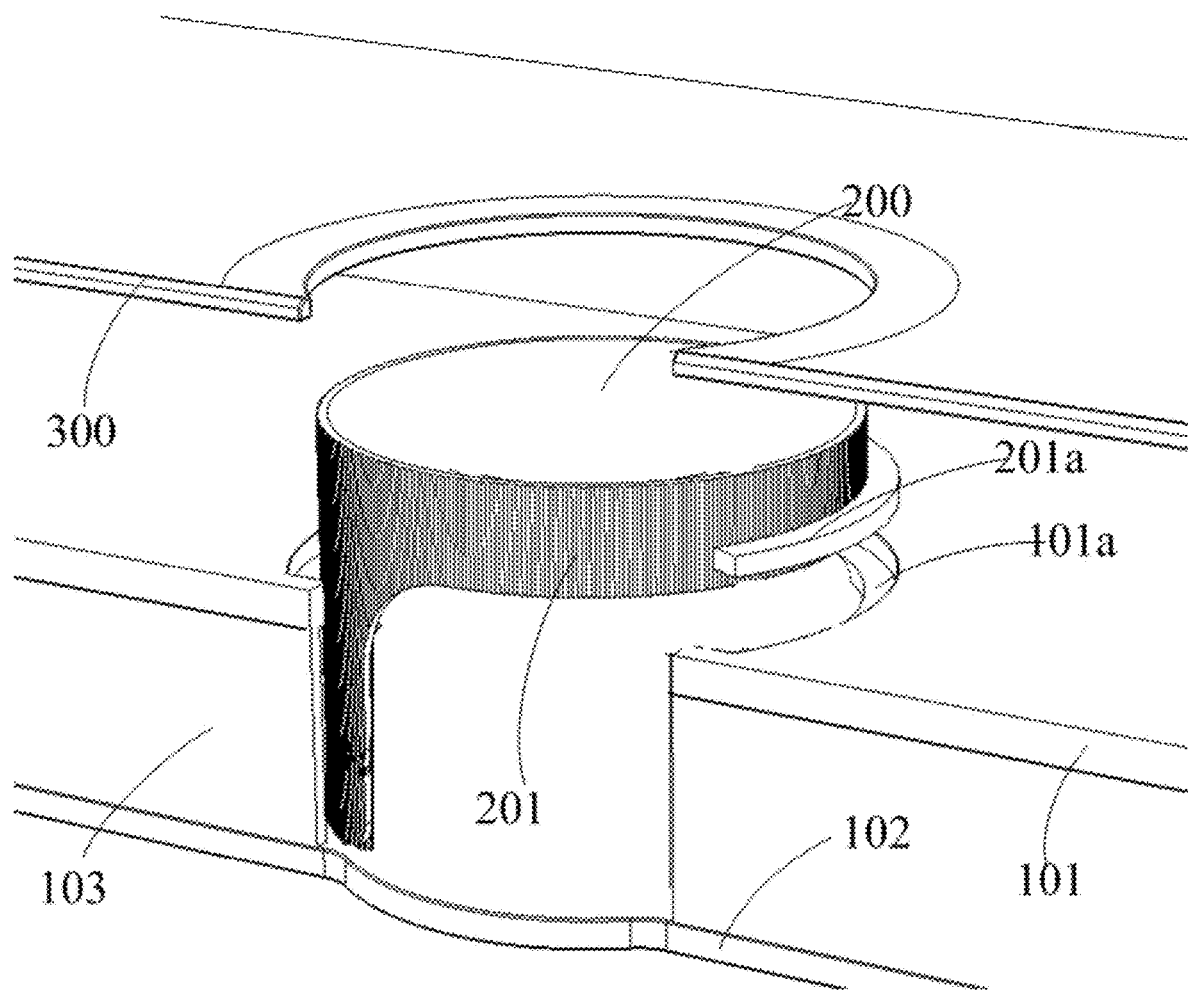
FIG. 4 is a schematic structural diagram of still another housing according to an embodiment of the present disclosure.

In an embodiment of the present disclosure, the knob lens cap 200 is movably connected to the case body 100. The case body 100 may be provided with a track, and then the case body 100 can be movably connected to the knob lens cap 200 by providing a matched rail on the knob lens cap 200. FIG. 4 is a schematic structural diagram of still another housing according to an embodiment of the present disclosure. With reference to FIG. 4, the case body 100 is provided with a track 101a.

Further, the knob lens cap 200 is provided with a rail 201a that matches the track 101a. The track 101a guides the rail 201a to move, so as to rotate the knob portion 201 to drive the knob lens cap 200 to rotate and move so as to shelter or expose the lens.

In an embodiment of the present disclosure, a groove surrounding the knob portion 201 is formed at a side of the first substrate 101 facing away from the second substrate 102, and this groove is the track 101a.

Further, the rail 201a is formed outside the knob portion 201.

The track 101a is specifically formed as a circular ring shaped track, so as to ensure that the knob portion 201 can be guided to rotate. Moreover, the circular ring shaped track 101a has an opening corresponding to the opening region of the annular connection plate 103. In order to prevent the rail 201a disposed outside the knob portion 201 from running beyond the circular ring shaped track 101a, stoppers are disposed at the opening of the circular ring shaped track 101a, i.e., each of the two ends of the circular ring shaped track 101a is provided with a stopper, so that the rail 201a is confined to move in the track 101a.

Furthermore, in an embodiment of the present disclosure, for avoiding detachment of the knob lens cap 200, with reference to FIG. 4, the housing further includes a cover plate 300 disposed at a side of the first substrate 101 facing away from the second substrate 102.

The cover plate 300 is configured to lock the rail 201a in the track 101a.

It should be noted that in another embodiment of the present disclosure, the track may be disposed on the knob lens cap and the matched rail is disposed on the case body; or, in other embodiments of the present disclosure, the rail may be disposed at a side, facing away from the knob portion, of the sheltering portion of the knob lens cap and the track may be disposed in the lens placement region of the second substrate, etc., which will not be limited herein.

Figure 5:
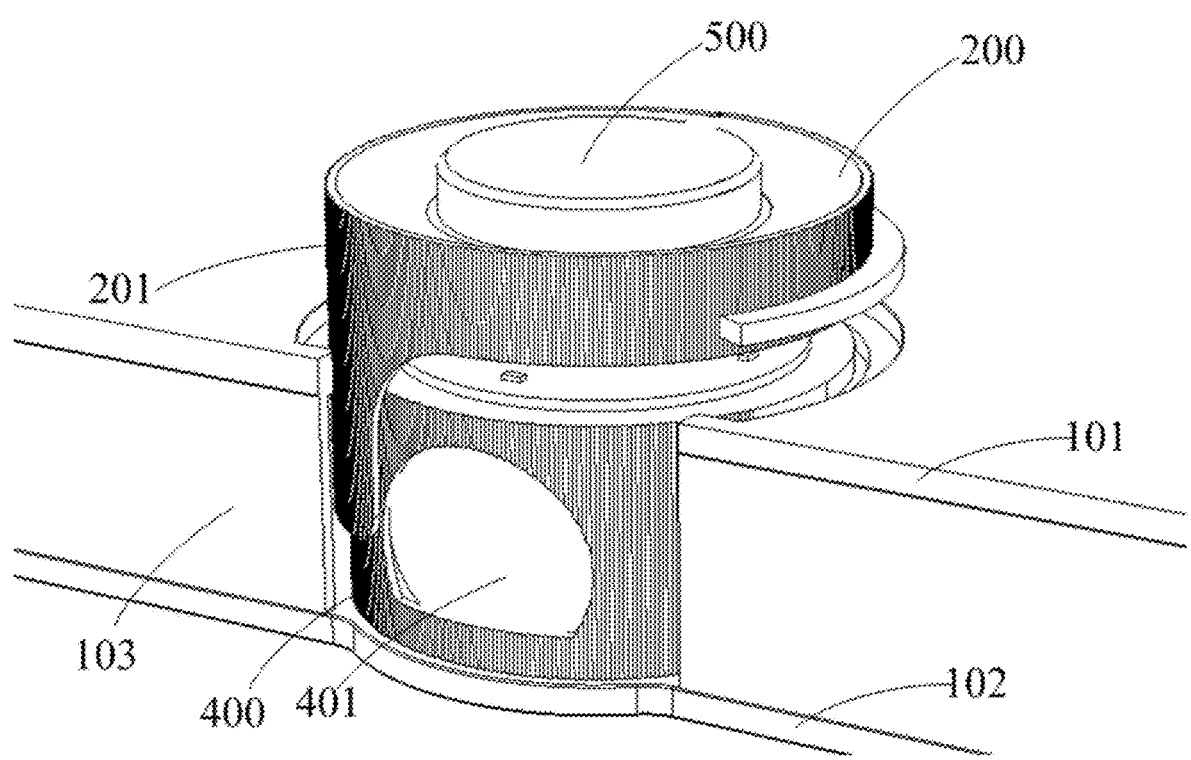
FIG. 5 is a schematic structural diagram of yet another housing according to an embodiment of the present disclosure.

Further, for better protecting the lens, a dustproof cover can be provided to wrap the lens so as to further improve the circumstance of dust attachment to the lens. FIG. 5 is a schematic structural diagram of yet another housing according to an embodiment of the present disclosure. With reference to FIG. 5, the housing further includes:

a dustproof cover 400 fixed at a side of the second substrate 102 facing the first substrate 101, the dustproof cover 400 being disposed in a space region enclosed by the knob lens cap 200, and an internal space of the dustproof cover 400 being used to arrange the lens.

The dustproof cover 400 is formed with a hollow light-transmission opening 401, and the hollow light-transmission opening 401 is disposed to face the lens.

Further, with reference to FIG. 5, a focusing opening passing through the knob portion 201 is formed in a direction along the central axis of rotation of the knob portion 201.

The housing further includes a focusing knob 500 disposed through the focusing opening, and the focusing knob 500 is configured to focus the lens.

Furthermore, in an embodiment of the present disclosure, for allowing the knob lens cap to have more functions during movement, the housing further includes a power control switch disposed in the knob lens cap, and the power control switch is configured to control connection and disconnection between the projection device and a power supply.

According to the control of the knob lens cap, the power control switch is switched on when the knob lens cap exposes the lens and switched off when the knob lens cap shelters the lens.

The power control switch provided by the present disclosure is a mechanical switch, and adopts contact control. When the knob lens cap moves to expose the lens, the power control switch connects the projection device and the power supply, thereby turning on the projection device for projection; when the knob lens cap moves to shelter the lens, the power control switch disconnects the projection device from the power supply, thereby turning off the projection device. The power control switch provided by this embodiment of the present disclosure may be a micro switch or a push switch, which is not limited herein by the present disclosure.

In any of the above embodiments of the present disclosure, the housing may further include a supporting plate, and the supporting plate is fixed at a side of the second substrate facing away from the first substrate and serves to support the case body.

Correspondingly, the present disclosure further provides a projection device, which includes the housing provided by any of the above embodiments. Herein, the projection device may specifically be a projector, which is not limited herein by the present disclosure.

An embodiment of the present disclosure provides a housing and a projection device, including a case body and a knob lens cap. The case body includes a first substrate, a second substrate, and an annular connection plate that enclose an internal space. The first substrate is disposed oppositely to the second substrate, and the annular connection plate is disposed between the first substrate and the second substrate. The second substrate includes a lens placement region for arranging a lens of the projection device. The knob lens cap is disposed in the lens placement region, and the knob lens cap includes a knob portion movably connected to the case body and extending out of the case body. The knob portion is rotated to drive the knob lens cap to rotate and move, so as to shelter or expose the lens.

It can be seen from the above that, for the technical solutions provided by the embodiments of the present disclosure, the housing includes a knob lens cap, and the knob lens cap includes a knob portion. The knob portion can be rotated to drive the knob lens cap to move, so as to shelter or expose the lens. Under the premise of ensuring normal usage of the projection device, when usage of the projection device is stopped, the knob lens cap shelters the lens so as to protect the lens and improve the circumstance of dust attachment to the lens. Moreover, by operating the knob lens cap in a rotating manner, it is convenient to operate the knob lens cap. Besides, the knob portion extends out of the case body, thereby further facilitating the user's operation. In other words, the knob portion of the knob lens cap extends out of the case body, so that the user can conveniently rotate the knob portion.

The above description of the disclosed embodiments enables those skilled in the art to implement or use the present disclosure. Various modifications can be made by those skilled in the art, and the general principle defined herein may be implemented in other embodiments without departing from the scope of the present disclosure. Therefore, the present disclosure is not limited by the embodiments herein, but has a broadest scope consistent with the principles and novel features disclosed herein.

What is claimed is:

1. A housing applied in a projection device, comprising:
a case body comprising a first substrate, a second substrate and an annular connection plate that enclose an internal space, wherein the first substrate is disposed oppositely to the second substrate, and the annular connection plate is disposed between the first substrate and the second substrate; the second substrate comprises a lens placement region in which a lens of the projection device is to be arranged, and an region of the annular connection plate corresponding to the lens is an opening region; and
a knob lens cap disposed in the lens placement region, the knob lens cap comprising a knob portion movably connected to the case body and extending out of the case body, the knob portion being configured to be rotated to drive the knob lens cap to rotate and move so as to shelter or expose the lens.

2. The housing according to claim 1, wherein a central axis of rotation of the knob lens cap is perpendicular to the second substrate and the first substrate, and the knob portion extends from the second substrate to the first substrate and extends out of the first substrate; the knob lens cap comprises a sheltering portion and an opening portion that are disposed between the first substrate and the second substrate, and the sheltering portion and the opening portion are connected to the knob portion, the knob portion being configured to be rotated to drive the sheltering portion or the opening portion to align with the lens.

3. The housing according to claim 1, wherein an outer surface of the knob portion is a frosted surface or provided with a plurality of stripes.

4. The housing according to claim 1, wherein the case body is provided with a track, the knob lens cap is provided with a rail that matches the track, and the track guides the rail to move, so that rotation of the knob portion drives the knob lens cap to rotate and move to shelter or expose the lens.

5. The housing according to claim 4, wherein a groove surrounding the knob portion is formed at a side of the first substrate facing away from the second substrate, and the groove is the track; and
the rail is formed outside the knob portion.

6. The housing according to claim 5, further comprising a cover plate disposed on the side of the first substrate facing away from the second substrate; wherein the cover plate is used to lock the rail in the track.

7. The housing according to claim 1, further comprising a dustproof cover fixed to a side of the second substrate facing the first substrate, wherein the dustproof cover is disposed in a space region enclosed by the knob lens cap, and an internal space of the dustproof cover is where the lens is to be arranged; and
wherein the dustproof cover is provided with a hollow light-transmission opening, and the hollow light-transmission opening is arranged to face the lens.

8. The housing according to claim 1, further comprising a power control switch disposed in the knob lens cap, the power control switch being configured to control connection and disconnection between the projection device and a power supply; wherein
under control of the knob lens cap, the power control switch is switched on when the knob lens cap exposes the lens and switched off when the knob lens cap shelters the lens.

9. The housing according to claim 1, wherein a focusing opening passing through the knob portion is formed in a direction along a central axis of rotation of the knob portion, and the housing further comprises a focusing knob disposed through the focusing opening, and the focusing knob is configured to focus the lens.

10. A projection device, comprising the housing according to claim 1.

11. A projection device, comprising the housing according to claim 2.

12. A projection device, comprising the housing according to claim 3.

13. A projection device, comprising the housing according to claim 4.

14. A projection device, comprising the housing according to claim 5.

15. A projection device, comprising the housing according to claim 6.

16. A projection device, comprising the housing according to claim 7.

17. A projection device, comprising the housing according to claim 8.

18. A projection device, comprising the housing according to claim 9.

* * * * *